(12) United States Patent
Huang et al.

(10) Patent No.: US 12,174,924 B2
(45) Date of Patent: Dec. 24, 2024

(54) SYSTEMS AND METHODS FOR TRACKING EVENTS OF A CLIENT DEVICE

(71) Applicant: SUANHUA INTELLIGENT TECHNOLOGY CO., LTD., Shanghai (CN)

(72) Inventors: Youming Huang, Shanghai (CN); Gengyang Chen, Shanghai (CN); Yuanyi Wu, Shanghai (CN); Yupeng Hu, Shanghai (CN); Minjun Nie, Shanghai (CN); Qingjun Jiang, Shanghai (CN)

(73) Assignee: SUANHUA INTELLIGENT TECHNOLOGY CO., LTD., Shanghai (CN)

( * ) Notice: Subject to any disclaimer, the term of this patent is extended or adjusted under 35 U.S.C. 154(b) by 825 days.

(21) Appl. No.: 17/223,084

(22) Filed: Apr. 6, 2021

(65) Prior Publication Data
US 2021/0224365 A1    Jul. 22, 2021

Related U.S. Application Data

(63) Continuation of application No. PCT/CN2019/073608, filed on Jan. 29, 2019.

(51) Int. Cl.
*G06F 21/31* (2013.01)
*G06F 9/54* (2006.01)
(Continued)

(52) U.S. Cl.
CPC ............ *G06F 21/316* (2013.01); *G06F 9/542* (2013.01); *G06F 11/3438* (2013.01); *G06F 21/552* (2013.01); *G06F 2201/86* (2013.01)

(58) Field of Classification Search
CPC .... G06F 21/316; G06F 9/542; G06F 11/3438; G06F 21/552; G06F 2201/86; G06F 11/3495; H04L 67/535
See application file for complete search history.

(56) References Cited

U.S. PATENT DOCUMENTS

| | | | |
|---|---|---|---|
| 8,429,243 B1 | 4/2013 | Wang et al. | |
| 2007/0124601 A1* | 5/2007 | Singh | G06F 21/62 713/182 |

(Continued)

FOREIGN PATENT DOCUMENTS

| | | |
|---|---|---|
| CN | 104182683 A | 12/2014 |
| CN | 104915398 A | 9/2015 |

(Continued)

OTHER PUBLICATIONS

First Office Action in Chinese Application No. 201980071285.9 mailed on Aug. 3, 2022, 14 pages.

(Continued)

*Primary Examiner* — Michael R Vaughan
(74) *Attorney, Agent, or Firm* — METIS IP LLC

(57) ABSTRACT

A method for tracking events of a client device is provided. The method may receiving, at a client device, a tracking script, wherein the tracking script provides instructions for the client device. The method may include tracking events of the client device as instructed by the tracking script. The method may include analyzing tracked events tracked as instructed by the tracking script. The method may include, upon occurrence of one or more analytical results corresponding to requirements indicated by the tracking script, sending tracking information to an analytics collection engine.

19 Claims, 8 Drawing Sheets

(51) Int. Cl.
    *G06F 11/34*     (2006.01)
    *G06F 21/55*     (2013.01)

(56) References Cited

U.S. PATENT DOCUMENTS

| | | | |
|---|---|---|---|
| 2009/0037914 A1 | 2/2009 | Chagoly et al. | |
| 2011/0078108 A1* | 3/2011 | Kumar | G06F 11/3006 |
| | | | 707/E17.037 |
| 2013/0194301 A1* | 8/2013 | Robbins | G06F 21/10 |
| | | | 345/629 |
| 2014/0359777 A1* | 12/2014 | Lam | G06F 21/577 |
| | | | 726/25 |
| 2015/0242296 A1 | 8/2015 | Mittal et al. | |
| 2015/0379268 A1 | 12/2015 | Singh et al. | |
| 2017/0139802 A1* | 5/2017 | Hajiyev | G06F 16/4387 |
| 2018/0131779 A1 | 5/2018 | Aycock | |
| 2018/0225715 A1* | 8/2018 | Caliolo | G06F 16/951 |
| 2021/0256088 A1* | 8/2021 | Shi | G06F 16/958 |
| 2022/0141300 A1* | 5/2022 | Yavilevich | H04L 67/535 |
| | | | 709/224 |

FOREIGN PATENT DOCUMENTS

| | | | | |
|---|---|---|---|---|
| CN | 105046601 A | 11/2015 | | |
| CN | 106599295 A | 4/2017 | | |
| CN | 107423048 A | 12/2017 | | |
| CN | 107480277 A | 12/2017 | | |
| CN | 107797908 A | 3/2018 | | |
| CN | 108494590 A | 9/2018 | | |
| CN | 108845918 A | 11/2018 | | |
| EP | 0952521 A2 * | 10/1999 | | G06F 11/3006 |
| ES | 2423313 T3 * | 9/2013 | | G06F 11/3438 |
| WO | 2007082190 A2 | 7/2007 | | |
| WO | 2016188334 A1 | 12/2016 | | |
| WO | 2017167042 A1 | 10/2017 | | |

OTHER PUBLICATIONS

International Search Report in PCT/CN2019/073608 mailed on Oct. 30, 2019, 4 pages.

Opinion in PCT/CN2019/073608 mailed on Oct. 30, 2019, 4 pages.

* cited by examiner

SYSTEMS AND METHODS FOR TRACKING EVENTS OF A CLIENT DEVICE

CROSS-REFERENCE TO RELATED APPLICATIONS

This application is a continuation of International Patent Application No. PCT/CN2019/073608, filed on Jan. 29, 2019, the contents of which are hereby incorporated by reference.

TECHNICAL FIELD

This disclosure generally relates to systems and methods for data processing, and more particularly to systems and methods for tracking events of a client device.

BACKGROUND

In big data era, it is important to gather data by tracking events caused by user interactions. The user interactions may relate to one or more webpages/pages of an application (e.g., a mobile application or a web application) installed in a client device. In some occasions, in order to track one or more specific events, a developer or a user may manually add script codes to corresponding webpages/pages. It is time-consuming to do so. Therefore, it is desirable to provide systems and methods to perform event tracking and data acquisition with a high efficiency.

SUMMARY

According to one aspect of the present disclosure, a method for tracking events of a client device is provided. The method may be implemented on a computing device having at least one processor and at least one computer-readable storage medium. The at least one processor may receive a tracking script. The tracking script may provide instructions for the client device. The at least one processor may track events of the client device as instructed by the tracking script. The at least one processor may analyze tracked events tracked as instructed by the tracking script. Upon occurrence of one or more analytical results corresponding to requirements indicated by the tracking script, the at least one processor may send tracking information to an analytics collection engine. The tracking information may at least include some of the one or more analytical results.

In some embodiments, the events may include user interactions with an object displayed on the client device.

In some embodiments, the at least one processor may track the events of the client device based on a tracking rule, the tracking rule associates with a data name and a data type related to each of the events.

In some embodiments, the data name may correspond to an input field embedded in a page of an application at the client device.

In some embodiments, the data type may correspond to an input field embedded in a page of an application at the client device.

In some embodiments, the tracking rule may be configurable via a user interface at a server device.

In some embodiments, the at least one processor may determine a first data name of a first input field associated with a first user interaction. The at least one processor may determine whether the first data name satisfies the tracking rule, and track an event associated with the first user interaction if the first data name satisfies the tracking rule.

In some embodiments, the at least one processor may obtain input data of a second input field associated with a second user interaction. The at least one processor may determine a second data type of the second input field based on the input data. The at least one processor may determine whether the second data type satisfies the tracking rule, and track an event associated with the second user interaction if the second data type satisfies the tracking rule.

In some embodiments, the at least one processor may record data associated with the tracked events, and determine statistical data using at least some of the recorded data.

In some embodiments, the at least one processor may direct the analytics collection engine to identify user identification based on the sent tracking information.

According to an aspect of the present disclosure, a system is provided. The system may include at least one storage device including one or more sets of instructions, and at least one processor in communication with the at least one storage device. When executing the set of instructions, the at least one processor may receive a tracking script. The tracking script may provide instructions for the client device. The at least one processor may track events of the client device as instructed by the tracking script. The at least one processor may analyze tracked events tracked as instructed by the tracking script. Upon occurrence of one or more analytical results corresponding to requirements indicated by the tracking script, the at least one processor may send tracking information to an analytics collection engine. The tracking information may at least include some of the one or more analytical results.

According to another aspect of the present disclosure, a non-transitory computer readable medium is provided. The non-transitory computer readable medium may comprise at least one set of instructions for tracking events of a client device. When executing the set of instructions, at least one processor may receive a tracking script. The tracking script may provide instructions for the client device. The at least one processor may track events of the client device as instructed by the tracking script. The at least one processor may analyze tracked events tracked as instructed by the tracking script. Upon occurrence of one or more analytical results corresponding to requirements indicated by the tracking script, the at least one processor may send tracking information to an analytics collection engine. The tracking information may at least include some of the one or more analytical results.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
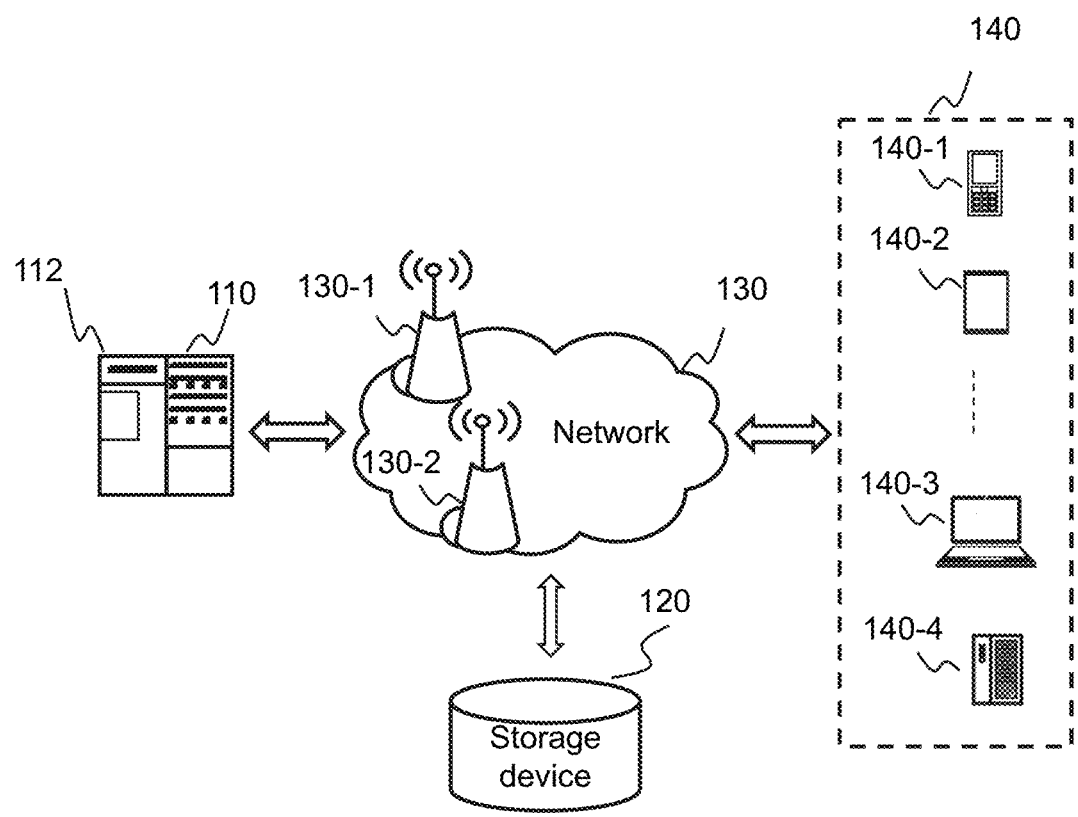
FIG. 1 is a schematic diagram illustrating an exemplary computer-based monitoring system for tracking events according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is to describe particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

The various embodiments of the present disclosure may relate to a computer-based monitoring system configured to enable the tracking of user-specified events, including but not limited to, a click event, an input event, etc. The computer-based monitoring system may include a server that allows a server-side user to create/configure a tracking rule for monitoring/tracking specific events. In the server, the server-side user may create the tracking rule by a user interface of the server. The server may encode or program the tracking rule as a tracking script. The tracking script may be sent to a client device. The client device may track the user-specified events as instructed by the tracking script.

The computer-based monitoring system may be designed to provide a user-configurable platform for monitoring and tracking user-specified events. The server-side user may configure the tracking rule to designate user-specified events. After the server-side user configures the tracking rule that designates the user-specified events, the tracking rule may be programmed into a tracking script and embedded in the client device to track the user-specified events. Additionally, the computer-based monitoring system may analyze the tracked events, and preprocess data/information related to the tracked events at the client device. In some embodiments, only the preprocessed data/information may be sent to the server, which aims at reducing the serve load (e.g., a storage pressure of the server). In some embodiments, the computer-based monitoring system may provide user identification based on the tracked events by, for example, identifying user login address and warning the user in response to an abnormal login address.

As used herein, the "event" may refer to a user interaction with a content item (e.g., various controls embedded in a page of an application), a user interaction with another user, a creation of a message or information, or any occurrence that may be represented as a data point. For example, a user input may be designated as an input event. As another example, a mouse click may be designated as a click event. In some embodiments, the data for an event may include the date or time of the event, an event unique identifier (ID), one or more event parameters, and so on. The event parameters may refer to data or information related to an event to be tracked. The event may include but not limited to a mouse click event, a keyboard event, a load event, an error event, and so on. In some embodiments, the event parameters may depend on the events to be tracked. Taking a keyboard event as an example, exemplary scripting code appears below: KeyboardEvent.initKeyboardEvent (typeArg, canBubbleArg, cancelableArg, viewArg, charArg, keyArg, locationArg, modifiersListArg, repeat). KeyboardEvent.initKeyboardEvent ( ) may initialize the attributes of a keyboard event. Therein the "typeArg", "canBubbleArg", "cancelableArg", "viewArg", "charArg", "keyArg", "locationArg", and "modifiersListArg" denote the event parameters associated with the keyboard event. For example, "typeArg" denotes the type of a keyboard event (e.g., a keydown event, a keypress event, or a keyup event); "canBubbleArg" denotes whether the keyboard event can bubble; "cancelableArg" denotes whether the keyboard event can be canceled; "viewArg" denotes the WindowProxy it is associated to; "charArg" denotes the value of the char attribute; "keyArg" denotes the value of the key attribute; "locationArg" denotes the value of the location attribute; and "modifiersListArg" denotes a whitespace-delineated list of modifier keys that should be considered to be active on the keyboard event's key. For example, specifying "Control Shift" indicates that the user was holding down the Control and Shift keys when pressing the key associated with the keyboard event. Note that the "event", "occurrence", "user interaction" may be used interchangeably in the present disclosure. Term "webpage" and "page" may be used interchangeably in the present disclosure.

Aspects of the computer-based monitoring system are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram or schematic diagram.

FIG. 1 is a schematic diagram illustrating an exemplary computer-based monitoring system for tracking events according to some embodiments of the present disclosure. The computer-based monitoring system 100 may be a platform for data and/or information processing, for example, tracking events associated with user interactions (e.g., a click event, an input event). The system 100 may include a server 110, a storage device 120, a network 130, and a client device 140. One or more components of the computer-based monitoring system 100 may be connected to each other via the network 130.

In some embodiments, the server 110 may be a single server, or a server group. The server group may be centralized, or distributed (e.g., the server 110 may be a distributed system). In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device having one or more components illustrated in FIG. 2 in the present disclosure.

In some embodiments, the server 110 may include a processing device 112. The processing device 112 may process information and/or data related to the tracked events, and perform one or more functions described in the present disclosure. For example, the processing device 112 may identify a user identification based on the tracked events, more particularly, the tracked events that satisfy a tracking rule. As another example, the processing device 112 may receive a request for configuring the tracking rule from a server-side user, and determine the tracking rule based on the request. The server-side user may configure the tracking rule by a user interface of the server 110. The tracking rule may be used to determine which events need to be tracked. Specifically, the tracking rule may be embedded in a client device (e.g., the client device 140) to instruct the client device to track user-specified events (e.g., a specified click event, an input event related to a specified input field). In some embodiments, the server-side user may specify one or more events, from a plurality of selectable events displayed in the user interface of the server 110, to be tracked. In some embodiments, the server-side user may customize one or more events to be tracked, besides the plurality of selectable events displayed in the user interface of the server 110. In some embodiments, the processing device 112 may encode/program the tracking rule as a tracking script, and generate a configuration file including the tracking script, for example, a Software Development Kit (SDK). The configuration file may be further deployed in a client device to instruct the client device to track the events that satisfy one or more requirements of the tracking rule. The one or more requirements of the tracking rule may include that the data name of an event matches a data name defined in the tracking rule, that the data type of an event matches a data type defined in the tracking rule, that the order of events satisfies a specified order, or the like, or a combination thereof. In some embodiments, the processing device 112 may include one or more processors (e.g., single-core processor(s) or multi-core processor(s)). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The storage device 120 may store data and/or instructions. In some embodiments, the storage device 120 may store data obtained/acquired from the server 110 and/or the client device 140. In some embodiments, the storage device 120 may store data and/or instructions that the server 110 may execute or use to perform exemplary methods and/or processes described in the present disclosure. In some embodiments, the storage device 120 may store data and/or instructions to perform exemplary methods and/or processes described in the present disclosure. In some embodiments, the storage device 120 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 120 may be connected to or communicate with the server 110. The server 110 may access data or instructions stored in the storage device 120 directly or via a network. In some embodiments, the storage device 120 may be a part of the server 110.

The network 130 may facilitate exchange of information and/or data. In some embodiments, one or more components in the computer-based monitoring system 100 (e.g., the server 110, the storage device 120, or the client device 140) may send and/or receive information and/or data to/from another component (s) in the computer-based monitoring system 100 via the network 130. For example, the server 110 may obtain/acquire tracking information from the client device 140 via the network 130. In some embodiments, the network 130 may be any type of wired or wireless network, or a combination thereof. Merely by way of example, the network 130 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, a global system for mobile communications (GSM) network, a code-division multiple access (CDMA) network, a time-division multiple access (TDMA) network, a general packet radio service (GPRS) network, an enhanced data rate for GSM evolution (EDGE) network, a wideband code division multiple access (WCDMA) network, a high speed downlink packet access (HSDPA) network, a long term evolution (LTE) network, a user datagram protocol (UDP) network, a transmission control protocol/Internet protocol (TCP/IP) network, a short message service (SMS) network, a wireless application protocol (WAP) network, a ultra wide band (UWB) network, an infrared ray, or the like, or any combination thereof. In some embodiments, the computer-based monitoring system 100 may include one or more network access points. For example, the computer-based monitoring system 100 may include wired or wireless network access points such as base stations and/or wireless access points 130-1, 130-2, . . . , through which one or more components of the computer-based monitoring system 100 may be connected to the network 130 to exchange data and/or information. In some embodiments, the data and/or information exchanged over the network 130 may be represented using technologies and/or formats including hypertext markup language (HTML) and extensible markup language (XML).

The client device 140 may include one or more computing devices that can receive input from a user and transmit (or receive) data via the network 130. In some embodiments, the client device 140 may include a commonly used computer system executing, for example, a Microsoft Windows compatible operating system (OS), an Apple MAC OS X, a Unix operating system, a Linux operating system, or the like. In some embodiments, the client device 140 may execute an application, for example, a browser application that allows a user of the client device 140 to operate on the client device. The user may interact with the client device 140 through an application programming interface (API) provided by the native operating system of the client device 140, such as, Windows Phone, iOS or Android. The client device 140 may communicate with other components of the computer-based monitoring system 100, such as the server 110 and/or the storage device 120, via the network 130.

Figure 4:
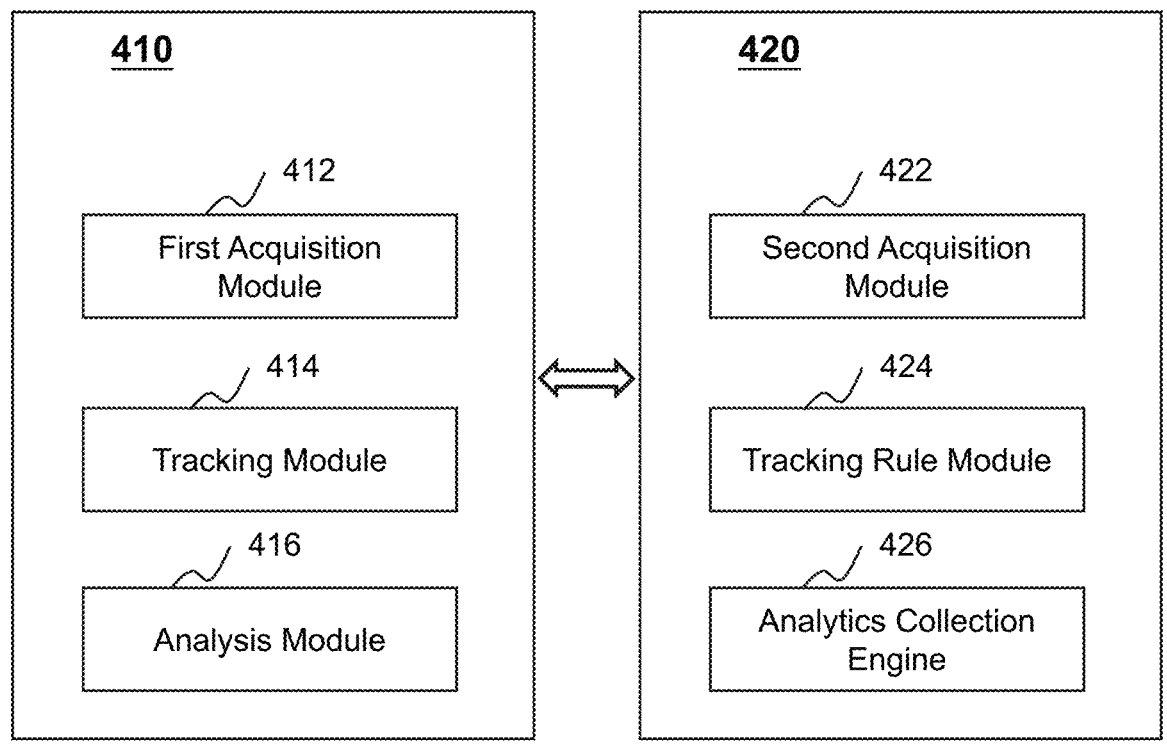
FIG. 4 is a block diagram illustrating exemplary processing devices at a client device and a server according to some embodiments of the present disclosure.

The client device 140 may receive the configuration file generated by the server 110 via the network 130. The configuration file (e.g., the SDK) may include the tracking script programmed by the server 110. In some embodiments, when the client device 140 detects an updated configuration file, the client device 140 may load and update the configuration file. In some embodiments, when starting the application installed in the client device 140, the client device 140 may access the configuration file, run the tracking script to track user-specified events based on the tracking rule. In some embodiments, the client device 140 may record and preprocess data related to the tracked events. For example, the client device 140 may generate statistical data using at least some of the recorded data. The client device 140 may send the preprocessed data to the server 110, for example, an analytics collection engine 426 as illustrated in FIG. 4. The server 110 may further process the sent preprocessed data to, for example, identify a user identification, generate a visual report, or generate user portrait information.

The client device 140 may include a mobile device 140-1, a tablet computer 140-2, a laptop computer 140-3, a built-in device in a motor vehicle 140-4, or the like, or any combination thereof. In some embodiments, the mobile device 140-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, smart glasses, a smart helmet, a smart watch, smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, augmented reality glasses, an augmented reality patch, or the like, or any combination thereof. For example, the virtual reality device and/or the augmented reality device may include a Google™ Glass, an Oculus Rift, a HoloLens, a Gear VR, etc. In some embodiments, the built-in device in the vehicle 140-4 may include an onboard computer, an onboard television, etc.

Noted that, the "server-side user" refers to a user or operator of the server 110, and the "client-side user" refers to a user or operator of the client device 140. In some embodiments, the server-side user and/or the client-side user may include any individual, any entity, or any tool that conducts operations related to the tracking of user-specified events.

Figure 2:
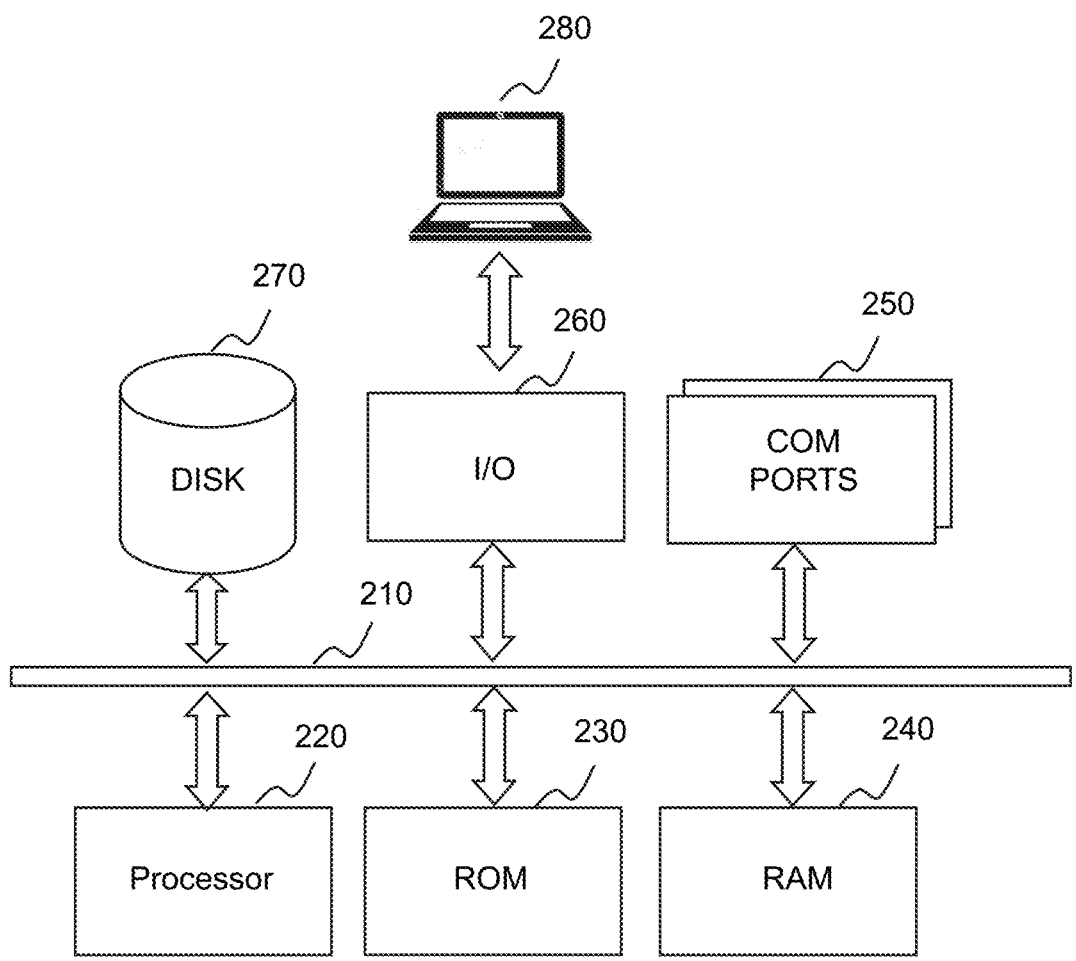
FIG. 2 is a schematic diagram illustrating exemplary components of a computing device according to some embodiments of the present disclosure.

FIG. 2 is a schematic diagram illustrating exemplary components of a computing device according to some embodiments of the present disclosure. The server 110, the storage device 120, and/or the client device 140 may be implemented on the computing device 200 according to some embodiments of the present disclosure. The particular system may use a functional block diagram to explain the hardware platform containing one or more user interfaces. The computer may be a computer with general or specific functions. Both types of the computers may be configured to implement any particular system according to some embodiments of the present disclosure. The computing device 200 may be configured to implement any components that perform one or more functions disclosed in the present disclosure. For example, the computing device 200 may implement any component of the computer-based monitoring system 100 as described herein. In FIGS. 1-2, only one such computer device is shown purely for convenience purposes. One of ordinary skill in the art would understand at the time of filing of this application that the computer functions relating to the service as described herein may be implemented in a distributed fashion on a number of similar platforms, to distribute the processing load.

The computing device 200, for example, may include COM ports 250 connected to and from a network connected thereto to facilitate data communications. The computing device 200 may also include a processor (e.g., the processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may transmit out the electronic signals from the processing circuits via the bus 210.

The exemplary computing device may include the internal communication bus 210, program storage and data storage of different forms including, for example, a disk 270, and a read-only memory (ROM) 230, or a random-access memory (RAM) 240, for various data files to be processed and/or transmitted by the computing device. The exemplary computing device may also include program instructions stored in the ROM 230, RAM 240, and/or other type of non-transitory storage medium to be executed by the processor 220. The methods and/or processes of the present disclosure may be implemented as the program instructions. The computing device 200 also includes an I/O component 260, supporting input/output between the computer and other components. The computing device 200 may also receive programming and data via network communications. The computing device 200 may also include a display 280 that displays content from one or more applications at the computing device 200. In some embodiments, a user of the computing device 200 may interact with the one or more applications (e.g., a browser application) through the display 280, such as clicking a link or typing information in an input field displayed on a page of the browser application.

Merely for illustration, only one processor and/or processor is illustrated in FIG. 2. Multiple CPUs and/or processors are also contemplated; thus operations and/or method steps performed by one CPU and/or processor as described in the present disclosure may also be jointly or separately performed by the multiple CPUs and/or processors. For example, if in the present disclosure the CPU and/or processor of the computing device 200 executes both operation A and operation B, it should be understood that operation A and operation B may also be performed by two different CPUs and/or processors jointly or separately in the computing device 200 (e.g., the first processor executes operation A and the second processor executes operation B, or the first and second processors jointly execute operations A and B).

Figure 3:
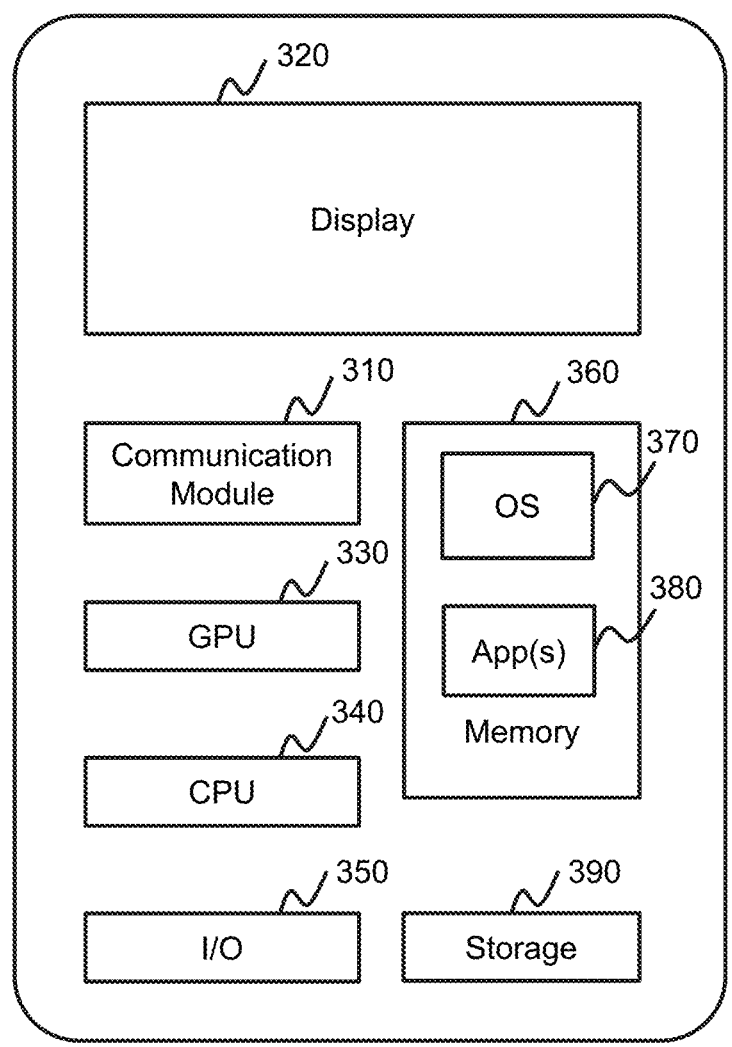
FIG. 3 is a schematic diagram illustrating exemplary hardware and/or software components of an exemplary mobile device according to some embodiments of the present disclosure.

FIG. 3 is a block diagram illustrating exemplary hardware and/or software components of an exemplary mobile device according to some embodiments of the present disclosure. The client device 140 may be implemented on the mobile device 300 according to some embodiments of the present disclosure. As illustrated in FIG. 3, the mobile device 300 may include a communication module 310, a display 320, a graphic processing unit (GPU) 330, a central processing unit (CPU) 340, an I/O 350, a memory 360, and a storage 390. The CPU 340 may include interface circuits and processing circuits similar to the processor 220. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to user interactions or other information from the computer-based monitoring system 100 on the mobile device 300. The User interactions with the information stream may be achieved via the I/O devices 350 and provided to the processing device 112 and/or other components of the computer-based monitoring system 100 via the network 130.

In order to implement various modules, units and their functions described above, a computer hardware platform may be used as hardware platforms of one or more elements (e.g., a component of the sever 110 described in FIG. 1). Since these hardware elements, operating systems, and program languages are common, it may be assumed that persons skilled in the art may be familiar with these techniques and they may be able to provide information required in the event tracking according to the techniques described in the present disclosure. A computer with user interface may be used as a personal computer (PC), or other types of workstations or terminal devices. After being properly programmed, a computer with user interface may be used as a server. It may be considered that those skilled in the art may also be familiar with such structures, programs, or general operations of this type of computer device. Thus, extra explanations are not described for the figures.

FIG. 4 is a block diagram illustrating processing devices at a client device and a server according to some embodiments of the present disclosure. The processing device 410 at the client device (e.g., the client device 140) may include a first acquisition module 412, a tracking module 414, and a data processing module 416. The processing device 420 at the server (e.g., the server 110) may include a second acquisition module 422, a tracking rule module 424, and an analytics collection engine 426. The processing device 410 and the processing device 420 may be same as or similar to the processing device 112 illustrated in FIG. 1, the processor 220 illustrated in FIG. 2, and/or the GPU 330 or the CPU 340 illustrated in FIG. 3. The modules may be hardware circuits of at least part of the processing device 410 and/or the processing device 420. The modules may also be implemented as an application or set of instructions read and executed by the processing device 410 and/or the processing device 420. Further, the modules may be any combination of the hardware circuits and the application/instructions. For example, the modules may be the part of the processing device 410 and/or the processing device 420 when the processing device 410 and/or the processing device 420 are executing the application/set of instructions respectively.

The first acquisition module 412 in the processing device 410 may receive a tracking script. In some embodiments, the first acquisition module 412 may generate a request for accessing an application (e.g., opening a browser application) based on, for example, an operation of a client-side user. The request may be sent to the processing device 420 (e.g., the second acquisition module 422). In response to the request, the processing device 420 may send a configuration file including the tracking script (e.g., a SDK) to the first acquisition module 412. The first acquisition module 412 may parse the configuration file to obtain the tracking script. In some embodiments, the first acquisition module 412 may check whether there is an update for the configuration file. Upon occurrence of the update, the first acquisition module 412 may load and update the configuration file accordingly. In some embodiments, the first acquisition module 412 may obtain data related to an event. The first acquisition module 412 may send the obtained data to the analysis module 416 for further analyzing.

The tracking module 414 in the processing device 410 may track events of the client device as indicated by the tracking script. In some embodiments, the tracking module 414 may track the user-specified events based the tracking rule included in the tracking script. In some embodiments, during the tracking, the tracking module 414 may record the data related to the tracked events, and preprocess the recorded data based on a data preprocessing strategy.

The analysis module 416 in the processing device 410 may analyze tracked events as instructed by the tracking script. In some embodiments, during the tracking, the analysis module 416 may analyze whether the events, caused by the user interactions, are the user-specified events to be tracked. In some embodiments, if the event satisfies one or more requirements of the tracking rule (e.g., a data name, or a data type), the analysis module 416 may return a positive result indicating that the current event is the user-specified event. Otherwise, the analysis module 416 may return a negative result indicating the current event is not the user-specified event. In some embodiments, the analysis module 416 may send tracking information to an analytics collection engine 426. The tracking information at least includes some of the one or more analytical results. In some embodiments, the one or more analytical results may include a positive result indicating that the current event is the user-specified event, a negative result indicating the current event is not the user-specified event, and/or data related to the current events.

In some embodiments, the analysis module 416 may determine a first data name of a first input field associated with a first user interaction. The analysis module 416 may determine whether the first data name satisfies the tracking rule. The analysis module 416 may track an event associated with the first user interaction if the first data name satisfies the tracking rule.

In some embodiments, the analysis module 416 may obtain input data of a second input field associated with a second user interaction. The analysis module 416 may determine a second data type of the second input field based on the input data. The analysis module 416 may determine whether the second data type satisfies the tracking rule. The analysis module 416 may track an event associated with the second user interaction if the second data type satisfies the tracking rule.

The second acquisition module 422 may receive a request from the server-side user, e.g., the request for determining one or more events to be tracked. In response to the request, the tracking rule module 424 may configure the tracking rule corresponding to the one or more events to be tracked. In some embodiments, the tracking rule module 424 may program the tracking rule as the tracking script, package the tracking script in the configuration file, and send the configuration file to the first acquisition module 412.

The analytics collection engine 426 may receive the tracking information related to the tracked events. In some embodiments, the analytics engine 426 may further identify user identification based on the sent tracking information. In some embodiments, the analytics collection engine 426 may prompt alerts to the client-side user if the sent tracking information is abnormal. In some embodiments, the analytic collection module 426 may generate a visual report for displaying the sent tracking information.

It should be noted that the above description of the processing devices 410 and 420 are merely provided for the purposes of illustration, and not intended to limit the scope of the present disclosure. For persons having ordinary skills in the art, multiple variations and modifications may be made under the teachings of the present disclosure. For example, the processing device 410 or the processing module 420 may further include a storage module facilitating data storage respectively. As another example, the processing device 410 or the processing module 420 may further include transmitting module exchanging data respectively. Those variations and modifications do not depart from the scope of the present disclosure.

Figure 5:
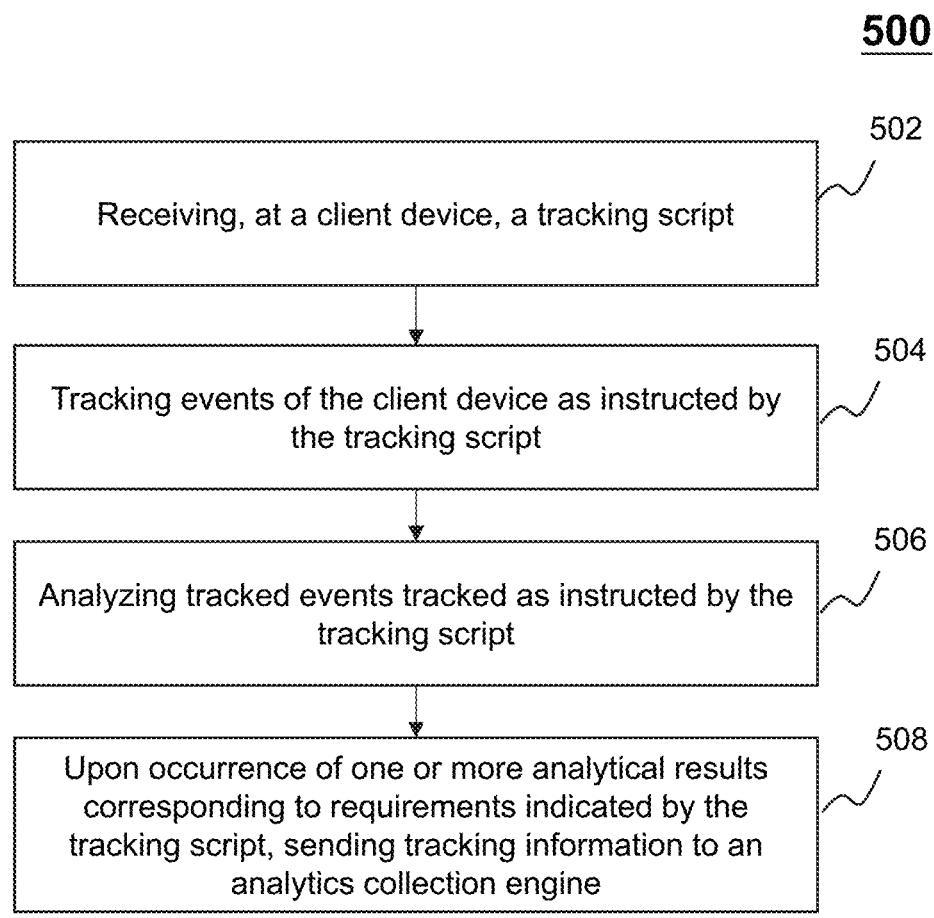
FIG. 5 is a flowchart illustrating an exemplary process for tracking events according to some embodiments of the present disclosure.

FIG. 5 is a flowchart illustrating an exemplary process for tracking events according to some embodiments of the present disclosure. In some embodiments, process 500 may be implemented in the computer-based monitoring system 100. For example, the process 500 may be implemented at the client device 140. In some embodiments, the process 500 may be stored in a storage (e.g., the ROM 230, the RAM 240, or the storage 390) in the form of instructions, and invoked and/or executed by the processor in the client device 140 (e.g., the processor 220 of the computing device 200, or the processing device 410).

In 502, the processor (e.g., the first acquisition module 412 of the processing device 410) of a client device (e.g., the client device 140) may receive a tracking script.

In some embodiments, the first acquisition module 412 may generate a request for accessing an application (e.g., opening a browser application) based on, for example, an operation of a client-side user. The request may be sent to the server 110 via the network 130. The server 110 may send a configuration file (e.g., a SDK) to the client device 140 in response to the request. The configuration file may be stored in a storage medium (e.g., the ROM 230, the RAM 240, or the storage 390) of the client device 140. The configuration file may include the tracking script programmed by the server 110. The first acquisition module 412 may further parse the configuration file to obtain the tracking script. In some embodiments, the first acquisition module 412 may check whether there is an update for the configuration file. Upon occurrence of the update, the first acquisition module 412 may load and update the configuration file accordingly. In some embodiments, the updated configuration file may include an updated tracking rule configured by the server-side user at the server 110.

In some embodiments, the tracking script may be written in, for example, Javascript or other scripting languages that are capable of being embedded in pages/webpages of the application installed in the client device 140. Note that the written language may depend on the operating system of the client device 140. For example, for the client device 140 that is a personal computer (PC) executing a Microsoft Windows OS, the tracking script may be written in Javascript. As another example, for the client device 140 that is a mobile device executing iOS, the tracking script may be written in Swift. As a further example, for the client device 140 that is a mobile device executing Android, the tracking script may be written in Java. For those skilled in the art, the written scripting languages may be various, and such variation should be within the protection scope of the present disclosure.

Figure 8A:
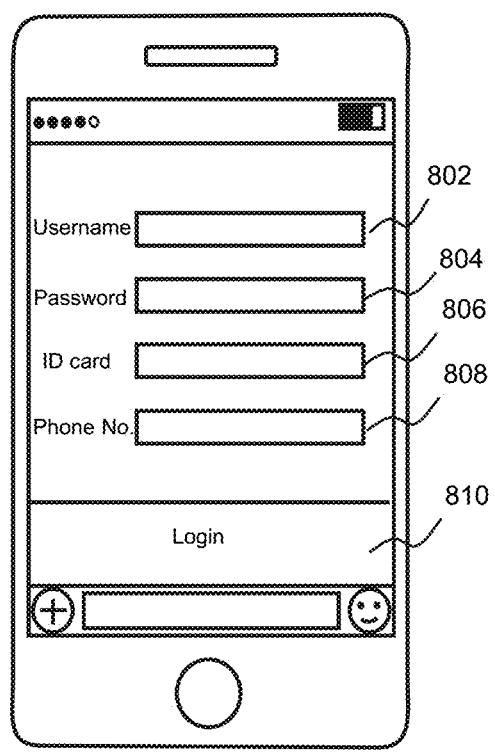
FIGS. 8A and 8B are schematic diagrams illustrating exemplary user interfaces of a client device according to some embodiments of the present disclosure.

In some embodiments, the tracking script may be used to track various events generated by user interactions. For example, the tracking script may include a tracking rule that designates one or more events to be tracked. In some embodiments, each possible event may correspond to a bound field embedded in the pages/webpages of the application installed in the client device 140. The tracking rule may designate the one or more events to be tracked by selecting all the bound fields or at least part thereof. A bound field may correspond to an object or a control embedded in the pages/webpages. For example, as shown in FIG. 8A, a first bound field may be designated as "user_name" that corresponds to an input field 802 representative of "Username", a second bound field may be designated as "pwd" that corresponds to an input field 8024 representative of "Password". In some embodiments, the tracking rule may select all the bound fields and thus the events corresponding to all the bound fields may be tracked. In some embodiments, the tracking rule may designate a portion of the bound fields and thus only the events corresponding to the selected bound fields may be tracked. For brevity, the events corresponding to the selected bound fields may also be referred to as user-specified events. Specifically, assuming that a total number of 100 bound fields corresponding to 100 different events are embedded in the pages/webpages of the application, the tracking rule may only select 5 bound fields to designate 5 user-specified events among the 100 different events. Note that, if the server-side user desires to track a specified event, he/she may just need to set the tracking rule at the server side (e.g., the tracking rule module 424 of the processing device 420 in the server 110) to select the bound field that corresponds to the specified event, and may not have to manually add any new tracking script that corresponds to the specified event in the webpage. For example, when the server-side user selects a new bound field associated with the specified event to create the new tracking rule, the tracking rule module 424 may automatically program the new tracking rule as the tracking script in the configuration file, instead of manually adding the new tracking script that corresponds to the specified event in the webpage.

In some embodiments, the tracking rule may be configured by the server-side user at the server 110. For example, the server-side user may specify one or more events, from a plurality of selectable events displayed in the user interface of the server 110, to be tracked, and configure the tracking rule related to the specified events (e.g., by designating the bound fields corresponding to the specified events). As another example, the server-side user may customize one or more events, besides the plurality of selectable events displayed in the user interface of the server 110, to be tracked, and configure the tracking rule related to the customized one or more events. In some embodiments, the server 110 (e.g., the tracking rule module 424 of the processing device 420 in the server 110) may further program the configured tracking rule to generate the tracking script. The tracking script may be packaged in a configuration file and sent to the client device 140 to instruct the client device to track the events specified or customized by the tracking rule.

In 504, the processor (e.g., the tracking module 414 of the processing device 410) may track events of the client device (e.g., the client device 140) as instructed by the tracking script. The tracking script may provide instructions for the tracking module 414 to track the events caused by the user interactions. In some embodiments, one event may be caused by a user interaction or a series of user interactions. In some embodiments, the tracking module 414 may track one or more user-specified events according to a tracking rule included in the tracking script.

In some embodiments, if the tracking rule is not configured at the server 110, the tracking script without the tracking rule or with a default tracking rule may instruct the client device 140 (e.g., the tracking module 414 of the processing device 410 at the client device 140) to track all the events caused by the user interactions. In some embodiments, if the tracking rule is configured at the server 110, the tracking script with the tracking rule may instruct the client device 140 (e.g., the tracking module 414 of the processing device 410 at the client device 140) to track the user-specified events caused by specified user interactions. For example, the user-specified events may include a mouse click event, a keyboard event, an input event, a webpage load event, or the like, or any combination thereof.

In some embodiments, the tracking rule may depend on a type of a control, embedded in the page/webpage of the application in the client device 140, associated with the event to be tracked. Exemplary control may include a button, a checkbox, a textbox, a text area, a link, or the like, or any combination thereof. In some embodiments, each control may relate to at least one piece of the tracking script. The tracking script may track one or more events corresponding to the controls. In some embodiments, the processing device 420 (e.g., the second acquisition module 422) may obtain a plurality of types of the controls, and determine the tracking rules corresponding to the plurality of types of the controls. For example, the processing device 420 (e.g., the tracking rule module 424) may determine a first tracking rule corresponding to a first control (e.g., a radio button). The first tracking rule may be used to track a click event associated with the radio button. For example, the tracking rule may include first bound field(s), such as "click_date", "click_times" or "click_content". As another example, the processing device 420 (e.g., the tracking rule module 424) may determine a second tracking rule corresponding to a second control (e.g., a textbox). The second tracking rule may be used to track an input event associated with the textbox. For example, the tracking rule may include second bound field(s), such as "input_date", "input_times" or "input_content". In some embodiments, the processing device 420 may also determine a same tracking rule corresponding to a same type of control.

In some embodiments, each event caused by a user interaction may correspond to a data name and/or a data type. To specify an event to be tracked, the tracking rule module 424 of the processing device 420 may configure the tracking rule based on the data name and/or data type corresponding to the specified event. Then, the tracking module 414 of the client device 140 may track the user-specified event(s) by comparing the data name and/or data type of an event with the data name and/or data type defined in the tracking rule. In some embodiments, the data name and/or date type may be represented by a bound field.

Figure 8B:
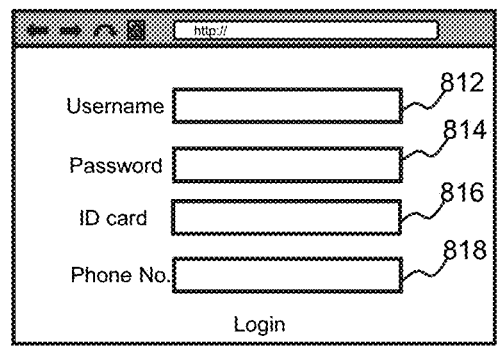

As used herein, the data name may denote a name of an input field embedded in the webpage/page of an application at the client device 140. Taking a page of an application in a mobile device as an example, as shown in FIG. 8A, an input field 802, which is represented by "Username", is configured to receive information of a username, and its data name may be denoted as <name="user_name">, where "user_name" may be designated as the bound field. The input field 804, which is represented by "Password", is configured to receive information of a password, and its data name may be denoted as <name="pwd">, where "pwd" may be designated as the bound field. The input field 806, which is represented by "ID card", is configured to receive information of an ID card (e.g., a card number), and its data name may be denoted as <name="user_ID">, where "user_ID" may be designated as the bound field. The input field 808, which is represented by "Phone No.", is configured to receive information of a phone number (e.g., a mobile phone number), and its data name may be denoted as <name="PhoneNumber">, where "PhoneNumber" may be designated as the bound field. Similar to FIG. 8A, the four input fields (i.e., 812-818) of a webpage as shown in FIG. 8B may each correspond to a data name. In some embodiments, the data name corresponding to the input field may be a default name. In some embodiments, the data name corresponding to the input field may be a name customized by the server-side user.

As used herein, the data type may denote a type of an input field embedded in the webpage/page of an application at the client device 140. Taking a page of an application in a mobile device as an example, as shown in FIG. 8A, the input field 802, which is represented by "Username", is configured to receive information of a username, and its data type may be denoted as <type="username">, where "username" may be designated as the bound field. The input field 804, which is represented by "Password", is configured to receive information of a password, and its data type may be denoted as <type="password">, where "password" may be designated as the bound field. The input field 806, which is represented by "ID card", is configured to receive information of an ID card (e.g., a card number), and its data type may be denoted as <type="id">, where "id" may be designated as the bound field. The input field 808, which is represented by "Phone No.", is configured to receive information of a phone number (e.g., a mobile phone number), and its data type may be denoted as below: <type="phonenumber">, where "phonenumber" may be designated as the bound field. Similar to FIG. 8A, the four input fields (i.e., 812-818) of a webpage as shown in FIG. 8B may each correspond to a data type. In some embodiments, the data type corresponding to the input field may be a default type. In some embodiments, the data type corresponding to the input field may be a type customized by the server-side user.

In some embodiments, the tracking rule may include a data preprocessing strategy. The data preprocessing strategy may be used to preprocess data associated with the tracked events. For example, the processing device 410 (e.g., the analysis module 416) may determine a statistical data by using at least some of the data associated with the tracked events. In some embodiments, the statistical data may relate to the number of times that a user-specified event is tracked. For example, the processing device 410 may count the number of times that client-side user(s) clicks the "Login" button 810 shown in FIG. 8A. As another example, the processing device 410 may count the number of times that client-side user(s) inputs each input field (e.g., the input fields 802-808 shown in FIG. 8A). In some embodiments, the statistical data may relate to a time duration of a tracked user-specified event (e.g., the time duration from the start time of the tracked user-specified event to the end time of the tracked user-specified event). For example, the processing device 410 may calculate the time duration from the client-side user starts entering data into the input field 802 to the client-side user completes entering data into the input field 802 (i.e., the time duration from an enter time of the input field 802 to an exit time of the input field 802 for the input event). In some embodiments, the statistical data may relate to a time point of a tracked user-specified event. For example, the processing device 410 may record the start/end time of the tracked user-specified event. In some embodiments, the statistical data may be customized by an operation the server-side user. For example, the server-side user may specify, for example, a sum, an average, a maximum, a minimum of data of one or more user-specified events as the statistical data.

In some embodiments, during the tracking, the tracking module 414 may record the data related to the tracked events, and preprocess the recorded data based on the data preprocessing strategy. In some embodiments, the preprocessed data may be sent to an analytics collection engine 426 for collection, storage, and/or reporting. In some embodiments, the analytics collection engine 426 may further identify user identification based on the sent data. More details regarding the identification of the user identification may be found elsewhere in the present disclosure (e.g., operation 508, and the description thereof).

In 506, the processor (e.g., the analysis module 416 of the processing device 410 in the client device 140) may analyze tracked events as instructed by the tracking script.

In some embodiments, during the tracking, the analysis module 416 may analyze whether the events, caused by the user interactions, are the user-specified events to be tracked. For example, the analysis module 416 may analyze whether the events are the user-specified events based on the tracking rule. The tracking rule may determine which events need to be tracked and sent to the server 110. In some embodiments, if the events satisfy one or more requirements of the tracking rule (e.g., the data name, or the data type), the analysis module 416 may return a positive result indicating that the current event is the user-specified event. Otherwise, the analysis module 416 may return a negative result indicating that the current event is not the user-specified event. For example, after the first acquisition module 412 detects a first user interaction associated with a first input field, the analysis module 416 may determine a first data name of the first input field. If the determined first data name satisfies the requirement(s) of the tracking rule, the analysis module 416 may return the positive result, and direct the tracking module 414 to track a first event caused by the first user interaction. As another example, the first acquisition module 412 may detect a second user interaction associated with a second input field. The second user interaction may relate to inputting data in the second input field. The analysis module 416 may determine a second data type of the second input field based on the input data. If the determined second data type satisfies the requirement(s) of the tracking rule, the analysis module 416 may return the positive result, and direct the tracking module 414 to track a second event caused by the second user interaction. As a further example, the first acquisition module 412 may detect a third user interaction associated with a third input field. The third user interaction may relate to inputting data in the third input field. The analysis module 416 may determine a third data name of the third input field and a third data type of the third input field based on the input data. If both the determined third data name and the third data type satisfy the requirement(s) of the tracking rule, the analysis module 416 may return the positive result, and direct the tracking module 414 to track a third event caused by the third user interaction. If at least one of the third data name and the third data type does not satisfy the requirement(s) of the tracking rule, the analysis module 416 may return the negative result, and stop tracking the third event caused by the third user interactions. More descriptions about tracking events based on the tracking rule may be found elsewhere in the present disclosure (e.g., FIGS. 6-7, and the descriptions thereof).

In some embodiments, the analysis module 416 may further determine whether the order of tracked events satisfies a specific order. The tracking rule may indicate the specific order for the events to be tracked. Taking FIG. 8A as an example, the specific order may be represented that a first input event for the first input field 802 (e.g., Username), a second input event for the second input field 804 (e.g., Password), a third input event for the third input field 806 (e.g., ID card), and a fourth input event for the fourth input field 808 need to be tracked in turn. If the order of tracked events satisfies the specific order, the analysis module 416 may return a positive result indicating that the order of tracked events satisfies the requirement(s) of the tracking rule. Otherwise, the analysis module 416 may return the negative result indicating that the order of tracked events does not satisfy the requirement(s) of the tracking rule.

In 508, upon occurrence of one or more analytical results corresponding to requirements indicated by the tracking script, the processor (e.g., the analysis module 416 of the processing device 410 in the client device 140) may send tracking information to an analytics collection engine 426. The tracking information may at least include some of the one or more analytical results. In some embodiments, the one or more analytical results may include a positive result indicating that a current event is the user-specified event, or a negative result indicating that a current event is not the user-specified event, and/or data related to the current events. Alternatively or additionally, the one or more analytical results may include a positive result indicating that the order of tracked events satisfies the requirement(s) of the tracking rule, or a negative result indicating that the order of tracked events does not satisfy the requirement(s) of the tracking rule. In some embodiments, the analysis module 416 may determine whether the current event satisfies the tracking rule. The analysis module 416 may generate the one or more analytical results by analyzing the current event (e.g., determining whether the data name and/or the data type of the input field related to the current event satisfy the tracking rule, determining whether the order of events satisfies a specified order). Upon occurrence of the one or more analytical results corresponding to the tracking rule, the analysis module 416 may send the one or more analytical results to the analytics collection engine 426.

In some embodiments, the analysis module 416 may record data associated with the tracked events. The analysis module 416 may preprocess the recorded data and generate statistical data based on at least some of the recorded data. As described elsewhere in the present disclosure, the statistical data may include but not limited to the number of times that a user-specified event is tracked, a time duration of a tracked user-specified event, a time point of a tracked user-specified event, a sum, an average, a maximum, a minimum of data of one or more user-specified events, or the like, or any combination thereof.

In some embodiments, the computer-based monitoring system 100 may be configured to identify user identification in various fields (e.g., a financial application, a security application, etc.). Specifically, the analytics collection engine 426 may identify user identification based on the sent tracking information. The analytics collection engine 426 may parse the sent tracking information to generate, such as, an account record, a user record, a site record, a visit record, a VisitAction record, and so on. The account record may indicate the account information associated with a user, a site, and a visitor. For example, the account record may be denoted as Account (id, name, site_id). When one event satisfies the tracking rule, the analysis module 416 may obtain the tracked event, and generate the account record related to the tracked event, for example, Account (id=123456, name=Chris, site_id=bea178d9cda74cdd40ce7e40ef29415a), where the user ID is 123456, the user name is Chris, and the website ID is bea178d9cda74cdd40ce7e40ef29415a. The analytics collection engine 426 may identify the user identification based on, for example, data included in the account record.

The user record may indicate information of user identification. The user may be an owner of an account. The user record may be denoted as User (id, first_name, last_name, email, password, phone_number, login_count, last_login, site_id). The analysis module 416 may generate the user record related to the tracked event, for example, User (id=123456, first_name=Chris, last_name=Paul, email=123456@gmail.com, password=123456, login_count=3, last_login=201801011314, site_id=bea178d9cda74cdd40ce7e40ef29415a), where the user ID is 123456, the first name of the user is Chris, the last name of the user is Paul, the user email is 123456@gmail.com, the password is 123456, the counts of logins is 3, a time of the last login is at 13:14 2018/01/01, and website ID is bea178d9cda74cdd40ce7e40ef29415a. The analytics collection engine 426 may identify the user identification based on, for example, data included in the user record.

The site record may indicate information of each site related to the tracked event. For example, the site record may be denoted as Site (account_id, site_id). In some embodiments, the analytics collection engine 426 may identify the user identification based on, for example, data included in the site record.

The visit record may indicate information of a user session with the webpage of an application installed in client device 140. For example, the visit record may be denoted as Visit (site_id, visitor_id, vist_entry, visit_exit, visit_count, visit_elaspsed_time, visit start, visit_end). In some embodiments, the analytics collection engine 426 may identify the user identification based on, for example, data included in the visit record.

The VisitAction record may indicate information of a single event during a visit. The VisitAction may be denoted as VisitAction (site_id, visitor_id, URL, name, URL_hash, visit_id). In some embodiments, the analytics collection engine 426 may identify the user identification based on, for example, data included in the VisitAction record.

In some embodiments, the analytics collection engine 426 may prompt alerts to the client-side user if the sent tracking information is abnormal. For example, assuming that a login event is the user-specified event configured by the server-side user, when a client-device user logins in the specific webpage, the tracking module 414 may track the login event, and the analytics collection engine 426 may parse data related to the login event (e.g., a user record, a site record, etc.). If the analytics collection engine 426 determines that the Internet Protocol (IP) address of the client-side user is abnormal (e.g., the IP address is not a usual IP address), the analytics collection engine 426 may send an alert to the client device 140 to notify the client-side user of the abnormity.

In some embodiments, the analytic collection module 426 may generate a visual report for displaying the sent tracking information. In some embodiments, the analytics collection module 426 may generate user portrait information based on the sent tracking information.

It should be noted that the above description of the process 500 is merely provided for the purposes of illustration, and not intended to limit the scope of the present disclosure. For persons having ordinary skills in the art, multiple variations and modifications may be made under the teachings of the present disclosure. For example, operation 504 and operation 506 may be integrated into a single operation. As another example, operation 504 and operation 506 may be performed synchronously. However, these variations and modifications still remain in the scope of the present disclosure.

Figure 6:
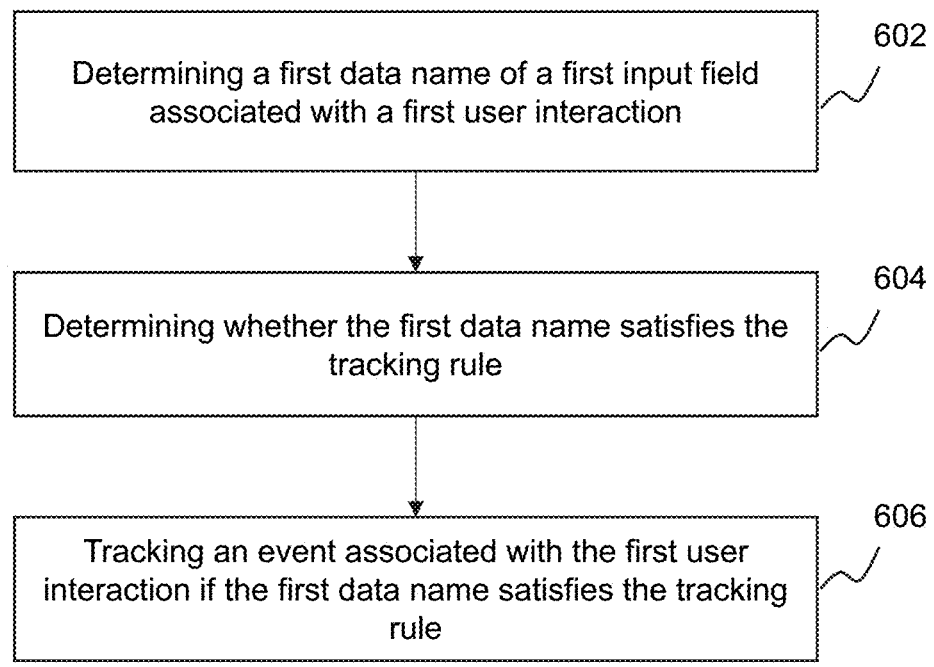
FIG. 6 is a flowchart illustrating an exemplary process for analyzing tracked events according to some embodiments of the present disclosure.

FIG. 6 is a flowchart illustrating an exemplary process for analyzing tracked events according to some embodiments of the present disclosure. In some embodiments, the process 600 may be implemented in the computer-based monitoring system 100. For example, the process 600 may be implemented by the client device 140. In some embodiments, the process 600 may be stored in a storage (e.g., the ROM 230, the RAM 240, or the storage 390) in the form of instructions, and invoked and/or executed by the processing device in the client device 140 (e.g., the processor 220 of the computing device 200, or the processing device 410).

In some embodiments, the server-side user may specify one or more events to be tracked, and the server 110 (e.g., the tracking module 424) may configure the tracking rules corresponding to the one or more user-specified events. The tracking rule may be written in a scripting language or a scripting code, such as Javascript. In some embodiments, when the tracking rule designates a specific data name, the processing device 410 may run the tracking script including the tracking rule, and track the user-specified events based on the specific data name.

In 602, the processor (e.g., the analysis module 416) may determine a first data name of a first input field associated with a first user interaction. For example, the first acquisition module 412 may detect the first user interaction associated with the first input field, and the analysis module 416 may identify the first data name of the first input field in response to a detection of the first user interaction.

In 604, the processor (e.g., the analysis module 416) may determine whether the first data name satisfies the tracking rule. In some embodiments, the analysis module 416 may determine whether the data name defined by the tracking rule matches a prefix of the determined first data name. For example, assuming that the tracking rule defines a data name that is "user_email", the analysis module 416 may detect the prefix of the first data name of the first input field and determine whether the prefix of the first data name includes the "user_email_". If the prefix of the first data name includes the defined data name, i.e., "user_email_", the analysis module 416 may determine that the first data name satisfies the tracking rule. Otherwise, the analysis module 416 may determine that the first data name does not satisfy the tracking rule.

In 606, the processor (e.g., the analysis module 416) may track an event associated with the first user interaction if the first data name satisfies the tracking rule. For example, after the analysis module 416 determines that the prefix of the first data name matches the data name defined by the tracking rule, the tracking module 414 may start tracking the event associated with the first user interaction. As shown in FIG. 8A, assuming that the input field 804 has a first data name with a prefix "pwd", if the tracking rule defines the data name of an event to be tracked as "pwd", which is identical to the prefix of the first data name of the input field 804, the analysis module 416 may determine that the first data name of the input field 804 satisfies the tracking rule and then track the input event caused by the first user interaction in the input field 804.

For illustration purpose, an example of pseudocodes for tracking an event that satisfies the tracking rule is described below.

```
{
"version":{
"seq":"1",
"date": "20180504"
},
"fields":[{
"page_name":"h5_0001",
"fields":[{
"field_category":"name",
"field_name_prefix":"address_",
"field_type": "",
"output_value":["enter_time","exit_time"]
}]}]}.
``` where "page_name" denotes a specific webpage associated with a user-specified event, "field_category" denotes a specific field defined by the tracking rule, such as, name (i.e., data name) or type (i.e., data type), "field_name_prefix" denotes a prefix of the data name of the input field, "field_type" denotes a specific data type defined by the tracking rule, "output_value" denotes an output value after the preprocessing. In the above pseudocodes, the tracking rule only defines the data name of the input field. According to the tracking rule, the analysis module 416 may track the event whose associated first input field has a data name matching the defined data name. That is to say, the user-specified event may have the data name with the prefix "address".

It should be noted that the above description is merely provided for the purposes of illustration, and not intended to limit the scope of the present disclosure. For persons having ordinary skills in the art, multiple variations and modifications may be made under the teachings of the present disclosure. For example, the process 600 may also include an operation for storing the data related to the tracked event. However, these variations and modifications still remain in the scope of the present disclosure.

Figure 7:
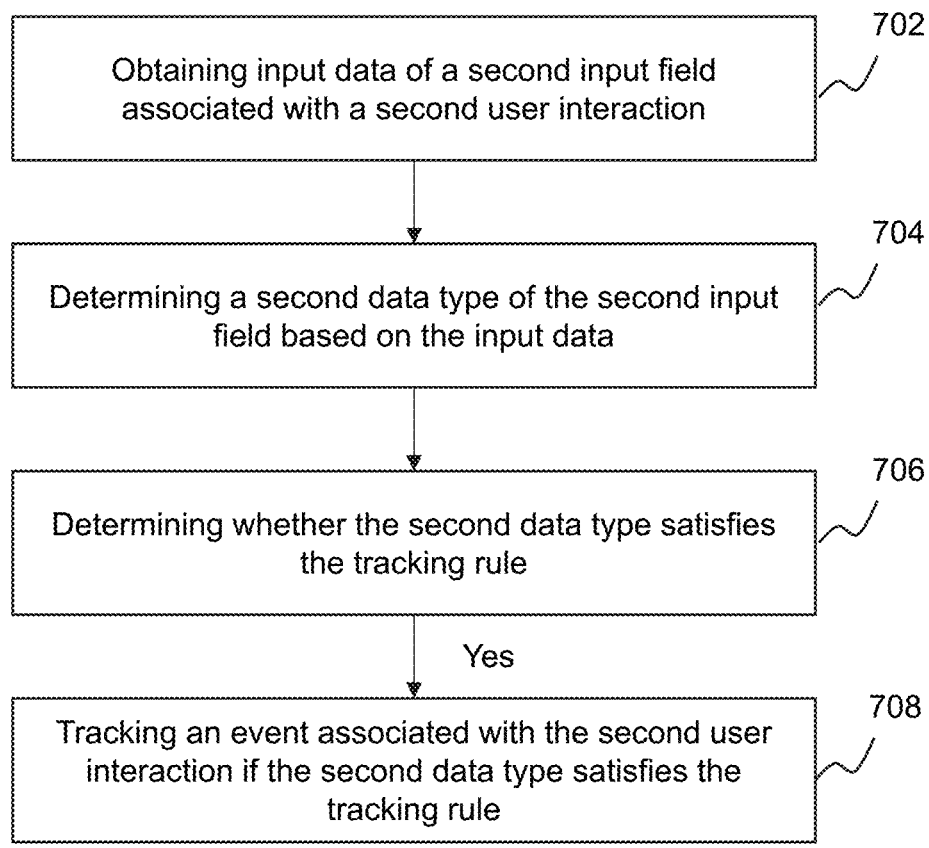
FIG. 7 is a flowchart illustrating an exemplary process for analyzing tracked events according to some embodiments of the present disclosure.

FIG. 7 is a flowchart illustrating an exemplary process for analyzing tracked events according to some embodiments of the present disclosure. In some embodiments, the process 700 may be implemented in the computer-based monitoring system 100. For example, the process 700 may be implemented at the client device 140. In some embodiments, the process 700 may be stored in a storage (e.g., the ROM 230, the RAM 240, or the storage 390) in the form of instructions, and invoked and/or executed by the processing device at the client device 140 (e.g., the processor 220 of the computing device 200, or the processing device 410).

In some embodiments, the server-side user may specify one or more events to be tracked, and the server 110 (e.g., the tracking module 424) may configure the tracking rules corresponding to the one or more user-specified events. The tracking rule may be written in a scripting language or a scripting code, such as Javascript. In some embodiments, when the tracking rule designates a specific data type, the processing device 410 may run the tracking script including the tracking rule, and track the user-specified events based on the specific data type.

In 702, the processor (e.g., the analysis module 416) may obtain input data of a second input field associated with a second user interaction.

The first acquisition module 412 may detect a second user interaction associated with a second input field. For example, the client-side user may input the number of his/her ID card in the input field 806 via various forms, such as keyboard typing, touch typing, speech input, and so on. The first acquisition module 412 may obtain the input data (i.e., the number of his/her ID card). In some embodiments, a certain number of characters or numbers need be input in the second input field. For example, as shown in FIG. 8A, for Chinese ID card, eighteen numbers need to be input in the input field 806. As another example, for Chinese mobile phone number, eleven numbers need to be input in the input field 808.

In 704, the processor (e.g., the analysis module 416) may determine a second data type of the second input field based on the input data. For example, if the client-side user inputs eighteen numbers in the second input field, the analysis module 416 may determine that the data type of the second input field is "ID card". If the client-side user input less than or more than eighteen numbers in the second input field, the analysis module 416 may determine that the data type of the second input field is not "ID card".

In 706, the processor (e.g., the analysis module 416) may determine whether the second data type satisfies the tracking rule. In some embodiments, the analysis module 416 may determine whether the second data type matches the data type defined by the tracking rule. For example, assuming that the tracking rule defines a data type that is an ID card, the analysis module 416 may determine whether the second data type of the second input field is the ID card. If the second data type of the second input field is ID card, the analysis module 416 may determine that the second data type satisfies the tracking rule. Otherwise, the analysis module 416 may determine that the second data type does not satisfy the tracking rule.

In 708, the processor (e.g., the analysis module 416) may track an event associated with the second user interaction if the second data type satisfies the tracking rule. In response to the determination that the second data type satisfies the tracking rule, the analysis module 416 may determine that the event caused by the second user interaction is the user-specified event and then track the event.

Exemplary pseudocode for tracking an event that satisfies the tracking rule is described as below:
{
"field_category":"type",
"field_name_prefix": "''",
"field_type": "id",
"output_value":["enter_time", "exit_time", "input_times"]
}, In the above pseudocodes, the tracking rule only defines the data type of the input field. If the second data type of a second input field associated with a second event matches the defined data type, the second event may be designated as the user-specified event, and the tracking module 414 may start tracking the second event.

It should be noted that the above description is merely provided for the purposes of illustration, and not intended to limit the scope of the present disclosure. For persons having ordinary skills in the art, multiple variations and modifications may be made under the teachings of the present disclosure. For example, the process 700 may also include an operation for storing the data related to the tracked event. However, these variations and modifications still remain in the scope of the present disclosure.

In some embodiments, the tracking rule may define both a data name and a data type of a user-specified event to be tracked. The first acquisition module 412 may detect a third user interaction associated with a third input field, and the third user interaction relates to input data in the third input field. The analysis module 416 may identify a third data name of the third input field, and a third data type of the third input field based on the input data. If both the determined third data name and the third data type satisfy the requirement(s) of the tracking rule, the analysis module 416 may return the positive result, and direct the tracking module 414 to track a third event caused by the third user interaction. If one of the third data name and the third data type does not satisfy the requirement(s) of the tracking rule, the analysis module 416 may return the negative result, and stop tracking the third event caused by the third user interactions.

For illustration purpose, an example of pseudocodes for tracking an event that satisfies the tracking rule is described as below:
{
"field_category":"name",
"field_name_prefix":"user_name_",
"field_type":"username",
"output_value":["enter_time", "exit_time", "input_times"]
}

In the above pseudocodes, the tracking rule defines that the data name field of the input field is "user_name", the data type field of the input field is "username". If the third data name and the third data type of the third input field associated with the third event match the defined data name and data type, the third event may be designated as the user-specified event, and the tracking module 414 may start tracking the third event.

FIGS. 8A and 8B are schematic diagrams illustrating exemplary user interfaces of a client device according to some embodiments of the present disclosure. The computer-based monitoring system 100 may be implemented on different types of client device 140, for example, a client device executing iOS or Android operating system, or a client device executing HTML and/or HTML5. FIG. 8A represents a first login page of an application installed in a smart phone. FIG. 8B represents a second login page of the same application installed in a laptop computer.

As shown in FIG. 8A, the first login page includes four input fields 802-808 and a login button 810. The processing device 410 may track one or more events associated with the first login page as instructed by a tracking script embedded in the first login page. In some embodiments, the tracking script may include a tracking rule. The server-side user may configure the tracking rule to track specified events, and program the tracking rule in the tracking script. In some embodiments, the tracking rule may define a prefix of a data name of the input field corresponding to the user-specified event to be tracked. And the processing device 410 may identify and track the event whose corresponding data name matches the defined prefix of the data name. If the prefix of a data name of an event (e.g., the event generated by an input to the input field 802) is consistent with the prefix of the data name defined by the tracking rule, the event may be designated as the user-specified event and may be further tracked. The processing device 410 may record/obtain data related to the tracked event, and preprocess the data by, for example, determining statistical data using at least some of the recorded data (e.g., enter_time, exit_time, input_times).

In some embodiments, the tracking rule may define a data type of an input field corresponding to the user-specified event to be tracked. For example, the client-side user may input data in a second input field, and an input event is generated accordingly. The processing device 410 may determine a second data type of the second input field based on the input data. The processing device 410 may determine whether the second data type matches the data type defined by the tracking rule. In response to the determination that the second data type matches the defined data type, the processing device 410 may determine that the input event is the user-specified event, and track the input event.

Similar to FIG. 8A, the client device 140 may also track events associated with four input fields 812-816 as indicated by the tracking script embedded in the second login page as shown in FIG. 8B.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

We claim:

1. A method for tracking events of a client device, the method comprising:
receiving, at the client device from a server, a configuration file that includes a tracking script, wherein the tracking script provides instructions for the client device and includes a tracking rule that designates one or more events to be tracked, and the tracking rule is configured at the server by a server-side user;
tracking events of the client device as instructed by the tracking script;
analyzing tracked events tracked as instructed by the tracking script; and upon occurrence of one or more analytical results corresponding to requirements indicated by the tracking script, sending tracking information to an analytics collection engine, wherein the tracking information at least includes some of the one or more analytical results;

checking whether there is an update for the configuration file;

upon occurrence of the update, loading and updating the configuration file to generate an updated configuration file, the updated configuration file including an updated tracking rule configured by the server-side user at the server.

2. The method of claim 1, wherein the events include user interactions with an object displayed on the client device.

3. The method of claim 1, wherein the tracking events of the client device as instructed by the tracking script includes:
tracking the events of the client device based on the tracking rule specified by the tracking script, the tracking rule associates with a data name and a data type related to each of the events.

4. The method of claim 3, wherein the data name corresponds to an input field embedded in a page of an application at the client device.

5. The method of claim 3, wherein the data type corresponds to an input field embedded in a page of an application at the client device.

6. The method of claim 1, wherein the analyzing tracked events tracked as instructed by the tracking script includes:
determining a first data name of a first input field associated with a first user interaction;
determining whether the first data name satisfies the tracking rule; and
tracking an event associated with the first user interaction if the first data name satisfies the tracking rule.

7. The method of claim 1, wherein the analyzing tracked events tracked as instructed by the tracking script includes:
obtaining input data of a second input field associated with a second user interaction;
determining a second data type of the second input field based on the input data;
determining whether the second data type satisfies the tracking rule; and
tracking an event associated with the second user interaction if the second data type satisfies the tracking rule.

8. The method of claim 1, wherein the analyzing tracked events tracked as instructed by the tracking script includes:
recording data associated with the tracked events; and
determining statistical data using at least some of the recorded data.

9. The method of claim 1, further comprising:
identifying, by the analytics collection engine, user identification based on the sent tracking information.

10. The method of claim 1, wherein the tracking script indicates a preset order of the tracked events,
and upon occurrence of one or more analytical results corresponding to requirements indicated by the tracking script, sending tracking information to an analytics collection engine comprises:
determining whether an order of the tracked events satisfies the preset order; and
in response to determining that the order of the tracked events satisfies the preset order, generating the tracking information that includes a positive result indicating that the order of the tracked events satisfies the requirements indicated by the tracking script.

11. The method of claim 1, further comprising:
determining, by the analytics collection engine, user login information of a client-side user of the client device based on the sent tracking information;
determining whether the user login information is abnormal; and
in response to determining that the user login information is abnormal, transmitting an alert to the client device.

12. The method of claim 1, wherein the configuration file is a Software Development Kit (SDK).

13. A system for tracking events of a client device, the system comprising:
at least one storage device including one or more sets of instructions;
at least one processor in communication with the at least one storage device, wherein when executing the one or more sets of instructions, the at least one processor is directed to:
receive, at the client device from a server, a configuration file that includes a tracking script, wherein the tracking script provides instructions for the client device and includes a tracking rule that designates one or more events to be tracked, and the tracking rule is configured at the server by a server-side user;
track events of the client device as instructed by the tracking script;
analyze tracked events tracked as instructed by the tracking script;
upon occurrence of one or more analytical results corresponding to requirements indicated by the tracking script, send tracking information to an analytics collection engine, wherein the tracking information at least includes some of the one or more analytical results;
check whether there is an update for the configuration file;
upon occurrence of the update, load and update the configuration file to generate an updated configuration file, the updated configuration file including an updated tracking rule configured by the server-side user at the server.

14. The system of claim 13, wherein the events include user interactions with an object displayed on the client device.

15. The system of claim 13, wherein to track events of the client device as instructed by the tracking script, the at least one processor is directed to:
track the events of the client device based on the tracking rule specified by the tracking script, the tracking rule associates with a data name and a data type related to each of the events.

16. The system of claim 13, wherein to analyze tracked events tracked as instructed by the tracking script, the at least one processor is directed to:
determine a first data name of a first input field associated with a first user interaction;
determine whether the first data name satisfies the tracking rule; and
track an event associated with the first user interaction if the first data name satisfies the tracking rule.

17. The system of claim 13, wherein to analyze tracked events tracked as instructed by the tracking script, the at least one processor is directed to:
obtain input data of a second input field associated with a second user interaction;
determine a second data type of the second input field based on the input data;

determine whether the second data type satisfies the tracking rule; and track an event associated with the second user interaction if the second data type satisfies the tracking rule.

18. The system of claim 13, wherein to analyze tracked events tracked as instructed by the tracking script, the at least one processor is directed to:

record data associated with the tracked events; and determine statistical data using at least some of the recorded data.

19. A non-transitory computer readable medium, comprising at least one set of instructions for tracking events of a client device, wherein when executed by at least one processor of a computing device, the at least one set of instructions causes the computing device to perform a method, the method comprising:

receiving, at the client device from a server, a configuration file that includes a tracking script, wherein the tracking script provides instructions for the client device and includes a tracking rule that designates one or more events to be tracked, and the tracking rule is configured at the server by a server-side user;

tracking events of the client device as instructed by the tracking script;

analyzing tracked events tracked as instructed by the tracking script; and upon occurrence of one or more analytical results corresponding to requirements indicated by the tracking script, sending tracking information to an analytics collection engine, wherein the tracking information at least includes some of the one or more analytical results;

checking whether there is an update for the configuration file;

upon occurrence of the update, loading and updating the configuration file to generate an updated configuration file, the updated configuration file including an updated tracking rule configured by the server-side user at the server.

* * * * *